United States Patent
Tiryaki et al.

(10) Patent No.: US 9,758,232 B2
(45) Date of Patent: Sep. 12, 2017

(54) SYSTEM AND METHOD FOR INTERCONNECTING COMPOSITE STRUCTURES

(71) Applicant: Airbus Operations GmbH, Hamburg (DE)

(72) Inventors: Memis Tiryaki, Jork (DE); Ulrich Bieling, Stade (DE)

(73) Assignee: Airbus Operations GmbH, Hamburg (DE)

( * ) Notice: Subject to any disclaimer, the term of this patent is extended or adjusted under 35 U.S.C. 154(b) by 35 days.

(21) Appl. No.: 14/199,034

(22) Filed: Mar. 6, 2014

(65) Prior Publication Data

US 2014/0286700 A1 Sep. 25, 2014

(30) Foreign Application Priority Data

Mar. 19, 2013 (EP) .................................... 13159937

(51) Int. Cl.
*B64C 1/00* (2006.01)
*B29C 65/48* (2006.01)
(Continued)

(52) U.S. Cl.
CPC ................ *B64C 1/00* (2013.01); *B29C 65/48* (2013.01); *B29C 65/562* (2013.01);
(Continued)

(58) Field of Classification Search
CPC ... Y10T 403/35; Y10T 403/50; Y10T 403/51; Y10T 403/551; Y10T 403/57;
(Continued)

(56) References Cited

U.S. PATENT DOCUMENTS

| 2,382,358 A * | 8/1945 | Watter | ..................... B64C 1/26 206/37 |
| 2008/0067289 A1 | 3/2008 | Meyer | |

(Continued)

FOREIGN PATENT DOCUMENTS

| DE | 102007029500 | 1/2009 |
| DE | 102007033868 | 1/2009 |

(Continued)

OTHER PUBLICATIONS

European Search Report, Aug. 2, 2013.

*Primary Examiner* — Matthieu F Setliff
(74) *Attorney, Agent, or Firm* — Greer, Burns & Crain, Ltd.

(57) ABSTRACT

A system for interconnecting components in a vehicle body structure, and especially for interconnecting fiber-reinforced composite components in a fuselage structure of an aircraft. The system includes a first adapter member, a second adapter member and a connector member. The first adapter member has a first mating portion configured to substantially conform with a profile of a first component of the structure in more than one plane. A first attachment portion is connected to the first mating portion. The second adapter member has a second mating portion configured to substantially conform with a profile of a second component of the structure in more than one plane. A second attachment portion is connected to the second mating portion. The connector member securely interconnects the first and second attachment portions of the first and second adapter members. A related method of interconnecting components in a vehicle body structure is also disclosed.

19 Claims, 1 Drawing Sheet

(51) Int. Cl.
  *B29C 65/56* (2006.01)
  *B29C 65/00* (2006.01)
  *B64F 5/10* (2017.01)
  *B64C 1/06* (2006.01)
  *B29L 31/30* (2006.01)
  *F16B 5/00* (2006.01)
  *F16B 11/00* (2006.01)

(52) U.S. Cl.
  CPC ...... *B29C 66/1142* (2013.01); *B29C 66/5241* (2013.01); *B29C 66/721* (2013.01); *B29C 66/72141* (2013.01); *B29C 66/742* (2013.01); *B64F 5/10* (2017.01); *B29C 66/7212* (2013.01); *B29L 2031/3082* (2013.01); *B64C 1/064* (2013.01); *B64C 2001/0072* (2013.01); *F16B 5/0004* (2013.01); *F16B 11/006* (2013.01); *Y02T 50/433* (2013.01); *Y10T 29/49622* (2015.01); *Y10T 403/4966* (2015.01)

(58) Field of Classification Search
  CPC ..... Y10T 403/66; Y10T 403/65; B29C 65/48; B29C 65/562; B29C 66/1142; B29C 66/5241; B29C 66/721; B29C 66/72141; B29C 66/742; B64C 1/00; B64F 5/0009
  See application file for complete search history.

(56) References Cited

U.S. PATENT DOCUMENTS

| | | |
|---|---|---|
| 2010/0181428 A1 | 7/2010 | Noebel et al. |
| 2010/0258676 A1 | 10/2010 | Gauthie et al. |
| 2010/0272954 A1 | 10/2010 | Roming et al. |
| 2010/0282905 A1 | 11/2010 | Cazeneuve et al. |
| 2011/0042519 A1 | 2/2011 | Tacke et al. |
| 2011/0073711 A1 | 3/2011 | Pina Lopez et al. |
| 2011/0139932 A1 | 6/2011 | Matheson et al. |
| 2012/0153082 A1 | 6/2012 | Rosman |
| 2013/0181092 A1 | 7/2013 | Cacciaguerra et al. |

FOREIGN PATENT DOCUMENTS

| | | |
|---|---|---|
| EP | 2336021 | 6/2011 |
| EP | 2540615 | 1/2013 |
| FR | 2906008 | 3/2008 |
| FR | 2922516 | 4/2009 |
| FR | 2922517 | 4/2009 |
| WO | 2009109438 | 9/2009 |

\* cited by examiner

SYSTEM AND METHOD FOR INTERCONNECTING COMPOSITE STRUCTURES

CROSS-REFERENCES TO RELATED APPLICATIONS

This application claims the benefit of the European patent application No. 13 159 937.5 filed on Mar. 19, 2013, the entire disclosures of which are incorporated herein by way of reference.

FIELD OF THE BACKGROUND

The present invention relates to a system and a method for interconnecting composite structures, especially for use in the fabrication of a vehicle chassis or body structure formed from composite components, such as fiber-reinforced polymer composite components. In addition, the invention relates to a composite structure, especially a chassis or body structure for a vehicle, such as an aircraft or spacecraft, fabricated using such a system and/or method.

BACKGROUND OF THE INVENTION

Construction techniques employed today in the fabrication of vehicle body structures, especially in the hull or fuselage structures of aircraft or spacecraft, are often modular in nature and involve construction of discrete modules or units, which are then joined or interconnected with one another. As the construction of entire fuselage structures for aircraft and spacecraft is now being pursued in composite materials, especially fiber-reinforced polymer composites such as carbon fiber-reinforced polymer (CRFP), to reduce overall mass, a satisfactory and reliable interconnection of the modules or units in such a modular structure is critical. In this regard, rigidity and integrity of a modern composite material fuselage structure is typically provided by elongate and longitudinally extending stringer profiles, such as cap profiles or Ω profiles, which also support the fuselage skin.

Currently, the technique of creating a splice or join between two modules in a composite fuselage structure involves inter-connecting the footings or flanges of respectively aligned, longitudinally extending stringer profiles of each module. In particular, the splice or join is made by arranging elongate coupling elements in the form of rigid flat strips to span between the modules and rigidly attaching respective the ends thereof to the footings or flanges of the aligned stringer profiles. A disadvantage of this technique, however, is that it is not optimized for strength and weight-saving potential.

SUMMARY OF THE INVENTION

It is therefore an idea of the present invention to provide a new and improved system and method for the interconnection of composite structures, particularly vehicle body structures produced from fiber-reinforced polymer composite components.

In accordance with the invention, a system and a method are provided for interconnecting composite structures, especially vehicle body structures fabricated from fiber-reinforced polymer composite components. Also, in accordance with the invention, a composite structure, such as vehicle body structure (e.g., a hull or fuselage structure for an aircraft or spacecraft), is also provided. Preferred features of the invention are recited in the dependent claims.

According to one aspect, therefore, the invention provides a system for interconnecting components in a structure, such as fiber-reinforced composite components in a fuselage structure of an aircraft, comprising:

a first adapter member having a first mating portion configured to substantially conform with a profile of a first component of the body structure in more than one plane, and a first attachment portion connected to the first mating portion;

a second adapter member having a second mating portion configured to substantially conform with a profile of a second component of the body structure in more than one plane, and a second attachment portion connected to the second mating portion; and a connector member for rigidly interconnecting the first and second attachment portions of the first and second adapter members.

Thus, the first and second adapter members each have a mating portion which substantially conforms to a profile of the respective first and second structural components in more than one plane. In this way, the mating portions of the adapter members essentially follow the shape or profile of the respective structural components to provide significantly enhanced force transfer between the structural components. In the case of the structural components representing stringers extending longitudinally in a fuselage structure, the forces are thus not merely directed via footings or flanges of the stringers, but rather over a much more significant portion of the stringer profile from a structural point of view, thus making the interconnection substantially more efficient.

In an embodiment of the invention, the first mating portion substantially conforms with an outer profile of the first component in more than one plane, and/or the second mating portion substantially conforms with an outer profile of the second component in more than one plane. To this end, the first mating portion is desirably adapted for connection with the first component over substantially conforming surfaces and the second mating portion is desirably adapted for connection with the second component over substantially conforming surfaces thereof. In particular, the first mating portion may sit upon and substantially match an outer surface of the first component, whereas the second mating portion may sit upon and substantially match an outer surface of the second component. In the case of the structural components representing aligned cap-profile or Ω-profile stringers in a fuselage structure, the first and second mating portions of the adapter members may be configured to essentially conform to or match the cap- or Ω-profiles of the stringers.

In another embodiment, the connection of the substantially conforming surfaces of the first mating portion and the first component is a bonded or cured connection, and preferably over a full extent of those surfaces. Similarly, the connection between the substantially conforming surfaces of the second mating portion and the second component is desirably a bonded or cured connection, again preferably over a full extent of those surfaces. Thus, the first and second mating portions of the first and second adapter members may be respectively configured to conform essentially fully with the outer profiles of the first and second components. As noted above, either or both of the first component and the second component may be an elongate channel section, such as a cap profile or an Ω profile, or may alternatively be any one of an elongate L section, T section or Z section. In this regard, the first component and the second component may have profiles that differ from one another.

In another embodiment, the connector member is configured to substantially conform to a profile or a surface of the first and second attachment portions in at least one plane, and preferably in more than one plane. In this regard, either or both of the first and second attachment portions of the respective adapter members may preferably have an L-shaped, a T-shaped (e.g., inverted) or a Z-shaped profile. The connector member, on the other hand, is preferably any one of a flat or plane elongate member, an elongate L-section, an elongate C-section or an elongate Z-section. Furthermore, the connector member may be desirably configured to be rigidly secured to the first and second attachment portions of the first and second adapter members by fasteners, such as rivets. The first adapter member and the second adapter member are preferably comprised of a composite material, more preferably a fiber-reinforced polymer composite, such as a carbon-fiber reinforced polymer (CFRP) material. Of course, other types of fiber, like glass or aramid, may also be used. In this way, the first and second adapter members may be comprised of a same composite material as the first and second components they are interconnecting. The connector member, on the other hand, may be comprised of a different material, such as a metal, like aluminum or titanium.

According to another aspect, the invention provides a method of interconnecting composite components in a structure, such as fiber-reinforced polymer composite components in a hull or fuselage structure of an aircraft, the method comprising:

connecting a first mating portion of a first adapter member with a profile of a first component of the structure over surfaces thereof that substantially conform in more than one plane;

connecting a second mating portion of a second adapter member with a profile of a second component of the structure over surfaces thereof that substantially conform in more than one plane; and securely interconnecting the first and second adapter members via a connector member.

In another embodiment of the invention, the first mating portion is connected with an outer profile of the first component, and/or the second mating portion is connected with an outer profile of the second component.

In another embodiment, connecting the substantially conforming surfaces of the first mating portion and the first component and/or connecting the substantially conforming surfaces of the second mating portion and the second component comprises bonding or curing, preferably over a full extent of the said surfaces. In this regard, if the first and second adapter members are comprised of a fiber-reinforced polymer composite that is the same as, or compatible with, the fiber-reinforced polymer composite of the first and second components, respectively, the bonding or co-curing of the respective mating portions with each of the components should be relatively straight-forward. The bonding may be achieved with an adhesive or co-reactive epoxy suited to the particular composite material (e.g., CFRP) of the first and second adapter mating portions and the first and second components, respectively.

In another embodiment, rigidly interconnecting the first and second adapter members includes fastening the connector member to first and second attachment portions of the respective first and second adapter members in at least one plane, and preferably in more than one plane, via fasteners, such as rivets.

According to a further aspect of the invention, a vehicle, such as an aircraft or spacecraft, is provided having a body structure (e.g., hull or fuselage structure) that incorporates a system for interconnecting components of the body structure according to any one of the embodiments described above. In particular, the fuselage structure may include a number of fuselage units or modules serially arranged along the length of the fuselage, and each pair of adjoining fuselage units or modules is interconnected at aligned longitudinally extending stringers of those adjoining fuselage units or modules via a system of the invention according to any of the embodiments described above.

BRIEF DESCRIPTION OF THE DRAWINGS

For a more complete understanding of the present invention and the advantages thereof, exemplary embodiments of the invention are explained in more detail in the following description with reference to the accompanying drawings, in which like reference characters designate like parts and in which.

The accompanying drawings are included to provide a further understanding of the present invention and are incorporated in and constitute a part of this specification. The drawings illustrate particular embodiments of the invention and together with the description serve to explain the principles of the invention. Other embodiments of the invention and many of the attendant advantages of the invention will be readily appreciated as they become better understood with reference to the following detailed description.

DETAILED DESCRIPTION OF THE PREFERRED EMBODIMENTS

It will be appreciated that common and well understood elements that may be useful or necessary in a commercially feasible embodiment are not necessarily depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not necessarily required. It will also be understood that the terms and expressions used in the present specification have the ordinary meaning as is accorded to such terms and expressions with respect to their corresponding respective areas of inquiry and study, except where specific meanings have otherwise been set forth herein.

Figure 1:
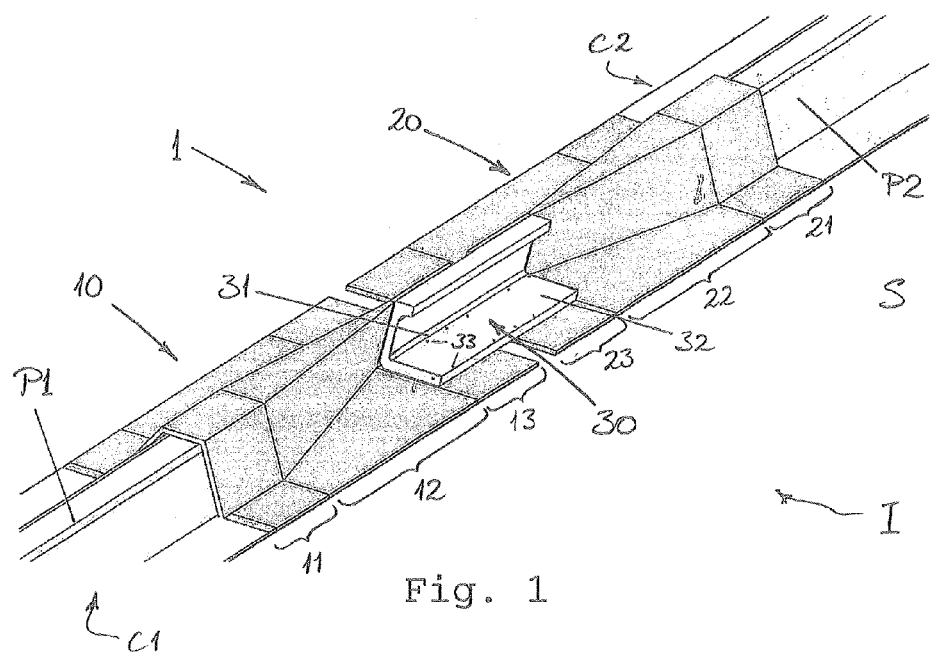
FIG. 1 is a perspective view of part of a hull or fuselage structure of an aircraft that has fiber-reinforced polymer composite components and incorporates a system for interconnecting the components according to an embodiment of the invention.
Figure 2:
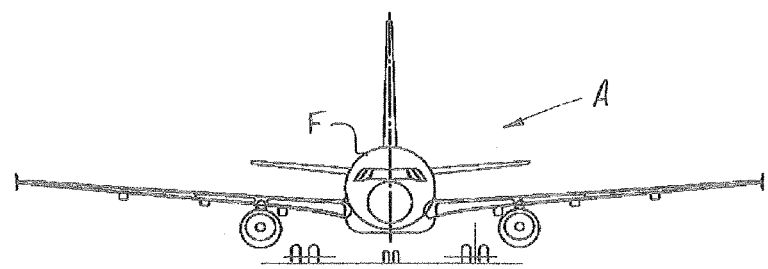
FIG. 2 is a schematic illustration of an aircraft which is fabricated using a method and system according to an embodiment of the invention.

Referring firstly to FIG. 1 of the drawings, an embodiment of a system 1 for interconnecting fiber-reinforced composite components C1, C2 in a structure S is illustrated. In this particular embodiment, the system 1 comprises a first adapter member 10 for connection to the first component C1, a second adapter member 20 for connection to the second component C2 and a connector member 30 for rigidly interconnecting the first and second adapter members 10, 20. The system 1 of this embodiment is especially applicable to the interconnection of structural components C1, C2 at an interface I of adjoining modules in a vehicle body structure S, such as a fuselage structure F of an aircraft A, as shown in FIG. 2.

In this particular example, the first structural component C1 is in the form of an elongate stringer component having a cap profile or an omega ($\Omega$) profile P1. As persons skilled in the art will appreciate, the term "profile" is a reference to the cross-sectional shape of the component in a plane transverse or perpendicular to a longitudinal extent of that component, and is also understood as the "section" of the component.

The first adapter member 10 includes a first mating portion 11 which is configured to substantially conform with an outer profile P1 of the first component C1. In other words, the first mating portion 11 presents surfaces which substantially conform to, match, or follow the outer surfaces of the first component C1. Accordingly, the first mating portion 11 has a corresponding cap, channel or omega ($\Omega$) profile which sits fittingly or snugly over the outer profile P1 of the first component C1. Further, because the first adapter member 10 is formed from the same fiber-reinforced polymer material (e.g., a CRFP) as the component C1, the first mating portion 11 may be readily bonded or fused to the outer surface profile P1 of the first component C1 in a co-curing or co-bonding procedure as will be understood by persons skilled in the art. To this end, adhesive bonding using a suitable adhesive, e.g., contact or epoxy adhesive, would also be suitable.

Similarly, it will be noted that the second adapter member 20 includes a second mating portion 21 which is also configured to substantially conform with an outer profile P2 of the second component C2. In particular, the second component C2 in this embodiment is also an elongate stringer having a cap or omega ($\Omega$) profile which is aligned with, and essentially corresponds to, the profile P1 of the first component C1. Thus, the second mating portion 21 is also configured to fit snugly over and follow the outer surfaces of the profile P2 of the second component C2 to which it is likewise bonded or fused, e.g., via a co-curing or co-bonding of corresponding fiber-reinforced polymer materials, over the full extent of the conforming surfaces.

Returning to a consideration of the first adapter member 10, it will be seen that the first mating portion 11 interfaces or connects with a transition portion 12, in which a cross-section of the first adapter member 10 changes or varies in a longitudinal direction of the structural components C1, C2. In particular, the transition portion 12 of the first adapter member 10 is designed such that a width of the central cap or channel section tapers and undergoes a transition to a T-profile or section (i.e., an inverted T-profile or section), which itself forms a first attachment portion 13 of the first adapter member 10. As is also apparent from drawing FIG. 1, the second adapter member 20 similarly incorporates a second transition portion 22, with which a profile or cross-section also progressively tapers or changes in a direction parallel to a longitudinal extent of the structural components C1, C2. The second transition portion 22 can thereby also provide a gradual change or transition in a profile or cross-section of the second adapter member 20 tapering down from a channel or cap-profile of the mating portion 21 to a T-shaped profile or section of a corresponding second attachment portion 23.

To complete the interconnection of the structural components C1, C2 using the system 1 of this invention at an interface I between the modules or units of the structure S, a connector member 30 in the form of an L-shaped section or profile is provided. The connector member 30 is configured to securely and/or rigidly interconnect the first and second attachment portions 13, 23 of the first and second adapter members 10, 20. In this regard, the L-shaped connector member 30 presents both horizontal and vertical surfaces which match or conform to respective surfaces of the T-profile attachment portions. Accordingly, a first end region 31 of the connector member 30 is rigidly connected with the first attachment portion 13 of the first adapter member 10 via rivets 33 and a second end region 32 of the connector member 30 is similarly rigidly connected or fixed to the second attachment portion 23 of the second adapter member.

In this way, the system 1 of this embodiment provides direct and highly efficient transfer of forces between the first and second structural components C1, C2 by utilizing the entire cross-section of the structural components. This, in turn, enables a weight-optimized solution by incorporating fiber-reinforced polymer composite elements in the interconnection system 1 corresponding to the materials of the components C1, C2 in the structure S itself.

Figure 3:
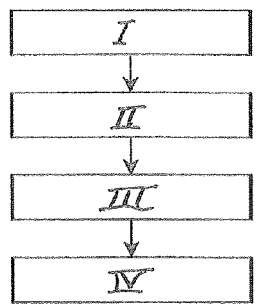
FIG. 3 is a flow diagram that schematically represents a method according to an embodiment of the invention.

With reference now to FIG. 3 of the drawings, a method of interconnecting the first and second components C1, C2 in the structure S (e.g., the fuselage F of an aircraft A) according to the invention is illustrated schematically, with numbered boxes I to IV of the diagram representing various operational stages of the method. The first box I represents connecting the first mating portion 11 of the first adapter 10 with the profile P1 of the first component C1 of the structure S over the substantially conforming surfaces thereof. In FIG. 3 the second box II represents connecting the second mating portion 21 of the second adapter member 20 with the profile P2 of the second component C2 of structure S over the substantially conforming surfaces thereof. In each case, the connecting of box I and box II will typically involve surface bonding (e.g., adhesive bonding) or co-curing of the first and second mating portions 11, 21 with the respective profiles P1, P2 of the first and second components C1, C2. The third box III represents positioning the connector member 30 between the attachment portions 13, 23 of respective first and second adapter members 10, 20, whereby the connector member 30 presents surfaces that conform with each of the attachment portions 13, 23 in at least one plane, and preferably in multiple planes. In the example of FIG. 1, the L-shaped profile of the connector member 30 substantially conforms to the T-profile attachment portions 13, 23 in two planes. The fourth box IV of FIG. 3 represents rigidly securing or fixing the first end 31 of the connector member 30 to the first attachment portion 13 and rigidly securing or fixing the second end 32 of the connector member 30 to the second attachment portion 23. In this regard, the fixing of the connector member 30 with each of the first and second adapter members 10, 20 is typically via fasteners, such as rivets 33.

Although specific embodiments of the invention have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In this document, the terms "comprise", "comprising", "include", "including", "contain", "containing", "have", "having", and any variations thereof, are intended to be understood in an inclusive (i.e., non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A system for interconnecting components in a vehicle structure, comprising:
   a first adapter member having a first mating portion conforming with a profile of a first component of the structure in more than one plane, a first attachment portion and a first transition portion, wherein the first transition portion connects the first mating portion to the first attachment portion, and wherein a cross section of the first transition portion progressively tapers in a direction parallel to a longitudinal extent of the first component;
   a second adapter member having a second mating portion conforming with a profile of a second component of the structure in more than one plane, a second attachment portion and a second transition portion, wherein the second transition portion connects the second mating portion to the second attachment portion, and wherein a cross section of the second transition portion progressively tapers in a direction parallel to a longitudinal extent of the second component,
   wherein the first and second transition portions of the first and second adapter members progressively tapers in the direction parallel to the longitudinal extent of the first and second component such that the first and second attachment portions have inverted T-profiles; and
      an elongate connector member configured to be rigidly secured or fixed to each of the first and second attachment portions of the first and second adapter members to securely interconnect the first and second attachment portions of the first and second adapter members, wherein the elongate connector member is extends parallel to the longitudinal extent of the first and second components when it interconnects the first and second attachment portions of the first and second adapter members.

2. The system according to claim 1, wherein the first mating portion conforms with an outer profile of the first component in more than one plane, and/or wherein the second mating portion conforms with an outer profile of the second component in more than one plane.

3. The system according to claim 1, wherein the first mating portion is adapted for connection with the profile of the first component over conforming surfaces thereof, and wherein the second mating portion is adapted for connection with the profile of the second component over conforming surfaces thereof.

4. The system according to claim 3, wherein the connection between the conforming surfaces of the first mating portion and the first component is a bonded or cured connection, over a full extent of the said surfaces, and wherein the connection between the conforming surfaces of the second mating portion and the second component is a bonded or cured connection, over a full extent of the said surfaces.

5. The system according to claim 1, wherein at least one of:
   the first mating portion is configured to conform fully with the outer profile of the first component, and
   the second mating portion is configured to conform fully with the outer profile of the second component.

6. The system according to claim 1, wherein at least one of the first component and the second component comprises one of an elongate channel section, an elongate L section, an elongate T section and an elongate Z section.

7. The system according to claim 6, wherein the elongate channel section comprises one of a cap profile and an Ω profile.

8. The system according to claim 1, wherein the connector member is configured to conform with a profile or a surface of the first and second attachment portions in at least one plane.

9. The system according to claim 8, wherein the connector member is configured to conform with a profile or a surface of the first and second attachment portions in more than one plane.

10. The system according to claim 1, wherein the connector member is any one of a flat plane member, an elongate L-section, C-section and Z-section, and wherein the connector member is configured to be rigidly secured to the first and second attachment portions of the first and second adapter members by fasteners.

11. The system according to claim 1, wherein the first adapter member and the second adapter member are comprised of fiber-reinforced composite material.

12. The system according to claim 1, wherein the connector member is comprised of a metal.

13. A method of interconnecting components in a vehicle body structure, the vehicle body structure comprising:
   a first adapter member having a first mating portion conforming with a profile of a first component of the structure in more than one plane, a first attachment portion and a first transition portion, wherein the first transition portion connects the first mating portion to the first attachment portion, and wherein a cross section of the first transition portion progressively tapers in a direction parallel to a longitudinal extent of the first component;
   a second adapter member having a second mating portion conforming with a profile of a second component of the structure in more than one plane, a second attachment portion and a second transition portion, wherein the second transition portion connects the second mating portion to the second attachment portion, and wherein a cross section of the second transition portion progressively tapers in a direction parallel to a longitudinal extent of the second component,
wherein the first and second transition portions of the first and second adapter members progressively tapers in the direction parallel to the longitudinal extent of the first and second component such that the first and second attachment portions have inverted T-profiles; and
an elongate connector member configured to be rigidly secured or fixed to each of the first and second attachment portions of the first and second adapter members to securely interconnect the first and second attachment portions of the first and second adapter members, wherein the elongate connector member extends parallel to the longitudinal extent of the first and second components when it interconnects the first and second attachment portions of the first and second adapter members, the method comprising:

connecting a first mating portion of a first adapter member with a profile of a first component of the body structure over surfaces thereof that conform in more than one plane;

connecting a second mating portion of a second adapter member with a profile of a second component of the body structure over surfaces thereof that conform in more than one plane; and rigidly interconnecting first and second attachment portions of the first and second adapter members via a connector member.

14. The method according to claim 13, wherein the components are fiber-reinforced composite components in a fuselage structure of an aircraft.

15. The method according to claim 13, wherein at least one of
the first mating portion is connected with an outer profile of the first component, and
the second mating portion is connected with an outer profile of the second component.

16. The method according to claim 15, wherein connecting the conforming surfaces of the at least one of the first mating portion and the profile of the first component and the second mating portion and the profile of the second component, comprises one of bonding or curing, over a full extent of the said mating portions.

17. The method according to claim 13, wherein rigidly interconnecting the first and second adapter members comprises fastening the connector member to the first and second attachment portions in at least one plane, via fasteners.

18. The method according to claim 13, wherein rigidly interconnecting the first and second adapter members comprises fastening the connector member to the first and second attachment portions in more than one plane, via fasteners.

19. An aircraft having a fuselage structure incorporating a system for interconnecting components of the fuselage structure, comprising:

a first adapter member having a first mating portion conforming with a profile of a first component of the structure in more than one plane, a first attachment portion connected to the first mating portion and a first transition portion, wherein the first transition portion connects the first mating portion to the first attachment portion, and wherein a cross section of the first transition portion progressively tapers in a direction parallel to a longitudinal extent of the first component;

a second adapter member having a second mating portion conforming with a profile of a second component of the structure in more than one plane, a second attachment portion and a second transition portion, wherein the second transition portion connects the second mating portion to the second attachment portion, and wherein a cross section of the second transition portion progressively tapers in a direction parallel to a longitudinal extent of the second component, wherein the first and second transition portions of the first and second adapter members progressively tapers in the direction parallel to the longitudinal extent of the first and second component such that the first and second attachment portions have inverted T-profiles; and an elongate connector member configured to be rigidly secured or fixed to each of the first and second attachment portions of the first and second adapter members to securely interconnect the first and second attachment portions of the first and second adapter members, wherein the elongate connector member extends parallel to the longitudinal extent of the first and second components when it interconnects the first and second attachment portions of the first and second adapter members.

* * * * *